(12) United States Patent
Xiao (10) Patent No.: US 7,815,306 B2
(45) Date of Patent: Oct. 19, 2010

(54) MAGNETIC LOCKER FOR SPECTACLE FRAME

(76) Inventor: Tony Xin Xiao, 4652 Lombardy Ct., Chino, CA (US) 91710

( * ) Notice: Subject to any disclaimer, the term of this patent is extended or adjusted under 35 U.S.C. 154(b) by 246 days.

(21) Appl. No.: 12/082,473

(22) Filed: Apr. 11, 2008

(65) Prior Publication Data
US 2009/0135370 A1    May 28, 2009

Related U.S. Application Data

(60) Provisional application No. 61/004,316, filed on Nov. 24, 2007.

(51) Int. Cl.
*G02C 5/14*    (2006.01)
*G02C 5/02*    (2006.01)
(52) U.S. Cl. .................. 351/116; 351/111; 351/124; 351/140
(58) Field of Classification Search ................ 351/118, 351/119, 111, 124, 41, 158, 116, 140
See application file for complete search history.

(56) References Cited

U.S. PATENT DOCUMENTS 4,153,348 A * 5/1979 Walters et al. ............... 351/118
4,946,268 A * 8/1990 Nowottny et al. ........... 351/118

* cited by examiner

*Primary Examiner*—Hung X Dang
(74) *Attorney, Agent, or Firm*—Raymond Y. Chan; David and Raymond Patent Firm (57) ABSTRACT

A locker of a spectacle frame, adapted for connecting a first member and a second member of the spectacle frame, includes a receiving portion, an inserting portion and a locking mechanism. The receiving portion is adapted for providing at an end of the first member of the spectacle frame. The inserting portion, which is adapted for providing at an end of the second member of the spectacle frame, is arranged to be freely slide into the receiving portion. The locking mechanism includes a locking member movably disposed between the receiving portion and the inserting portion as a locking position to lock up the inserting portion from being detached from the receiving portion. The locking member is able to be driven from the locking position to an unlocking position that the inserting portion is able to be slid out of the receiving portion for separating the first and second members. The locker can be used in spectacle frame for exchanging and adjusting temples, end-pieces, hinges as well as the bridge.

23 Claims, 12 Drawing Sheets

MAGNETIC LOCKER FOR SPECTACLE FRAME

CROSS REFERENCE OF RELATED APPLICATION

This is a non-provisional application that claims the benefit of priority under 35 U.S.C. §119 to a provisional application, application No. 61/004,316, filed Nov. 24, 2007.

BACKGROUND OF THE PRESENT INVENTION

1. Field of Invention

The present invention relates to spectacle frame, and more particularly to a magnetic locker which can be used in temples, end-pieces, hinges or a bridge of spectacle frame for creating the changing and adjusting functions to spectacle.

2. Description of Related Arts

A conventional spectacle frame has fixed temples, fixed end-pieces and a fixed bridge. They are on one frame one style basis and also they are not changeable. What about one frame with multiple styles? Does the eyewear market have such demand? The answer is positive. Our life style for chasing the perfect match of clothes and spectacle frames become very fashionable nowadays. For example, when a lady wears a purple dress, she may want to wear a pair of purple glasses to match her cloth. As a matter of fact, without a changeable frame, she needs to buy different color frames or different style frames to match her desire and it will cost more.

In recent year, there are some changeable frames being sold in the market place, but they are all limited in changing temples. As we study deeply, the key technology of the changing frames is how the locking methods being use in the frame. In general, these changeable frames utilize a spring lock as their key structure. In order to make temples smaller, usually the small spring has been used in the temples, so that the changing temples become unstable. On the other hand, the switch of changing temple is fixed on outside of the temple, which also affects its appearance of the frames.

SUMMARY OF THE PRESENT INVENTION

An object of the present invention is to solve the above problems and provide a magnetic locker used in the changeable frames. It can be used in changing temples, end-pieces, hinges as well as a bridge. Besides that, the changing frames also have adjustable feature in which the length of temples and the bridge can be changed.

Another object of the present invention is to provide a magnetic locker for spectacles, which having an excellence locked up and released abilities. These abilities can be used to create changeable frames in the actual practice.

One of the actual practices on the present invention, the magnetic locker is used in the temples of the spectacle frames. With the excellence locked up and released abilities on the temples, the temples become exchangeable and adjustable.

Another one of the actual practices on the present invention, the magnetic locker is used in the end-pieces of the spectacle frames. With the excellence locked up and released abilities on the end-pieces, the end-pieces become exchangeable and adjustable.

Another one of the actual practices on the present invention, the magnetic locker is used in the bridge of the spectacle frames. With the excellence locked up and released abilities on the bridges, the bridge becomes exchangeable and adjustable.

Another one of the actual practices on the present invention, the magnetic locker is used in the hinges of the spectacle frames. The character of this new hinge is to utilize the magnets as the axles of the hinge instead of screw that we usually use, so that there is no screw being used in the new hinge.

Accordingly, in order to accomplish the above objects, the present invention provides a locker for connecting a first member and a second member of a spectacle frame, wherein locker is embodied as a magnetic locker in the present invention. The magnetic locker comprises a receiving portion, an inserting portion and a locking mechanism. The receiving portion is adapted for providing at an end of the first member of the spectacle frame. The inserting portion, which is adapted for providing at an end of the second member of the spectacle frame, is arranged to be freely slide into the receiving portion. The locking mechanism includes a locking member movably disposed between the receiving portion and the inserting portion as a locking position to lock up the inserting portion from being detached from the receiving portion, wherein the locking member is able to be driven from the locking position to an unlocking position that the inserting portion is able to be slid out of the receiving portion for separating the first and second members.

In one embodiment, the present invention provides a magnetic locker which comprises an inserting portion, a receiving portion and a magnetic locking member. The inserting portion, having an open housing for disposing the locking member, is fixed on the frame. The hollow receiving portion has a predetermined recess corresponding to the open housing. When the inserting portion slides inside the receiving portion, the locking member engaged with the predetermined recess by magnetic force, so that the inserting portion and the receiving portion are securely locked in a predetermined position.

These and other objectives, features, and advantages of the present invention will become apparent from the following detailed description, the accompanying drawings, and the appended claims.

Still further objects and advantages will become apparent from a consideration of the ensuing description and drawings.

DETAILED DESCRIPTION OF THE PREFERRED EMBODIMENTS

Referring to FIGS. 1 to 12E, the present invention provides a locker for connecting a first member and a second member of a spectacle frame, which comprises an inserting portion 10 and a receiving portion 20. The receiving portion 20 is adapted for providing at an end of the first member of the spectacle frame and the inserting portion 10, which is adapted for providing at an end of the second member of the spectacle frame, being arranged to be freely slide into the receiving portion 20.

The locker further comprises a locking mechanism which includes a locking member 5 movably disposed between the receiving portion 20 and the inserting portion 10 as a locking position to lock up the inserting portion 10 from being detached from the receiving portion 20, wherein the locking member 5 is able to be driven from the locking position to an unlocking position that the inserting portion 10 is able to be slid out of the receiving portion 20 for separating the first and second members.

According to the preferred embodiments of the present invention, the locking member 5 is a magnetic locking member made of magnetic material for enabling the first and second members of the spectacle frame being assembled by means of magnetic force and being disassembled for user changeable.

Figure 1:
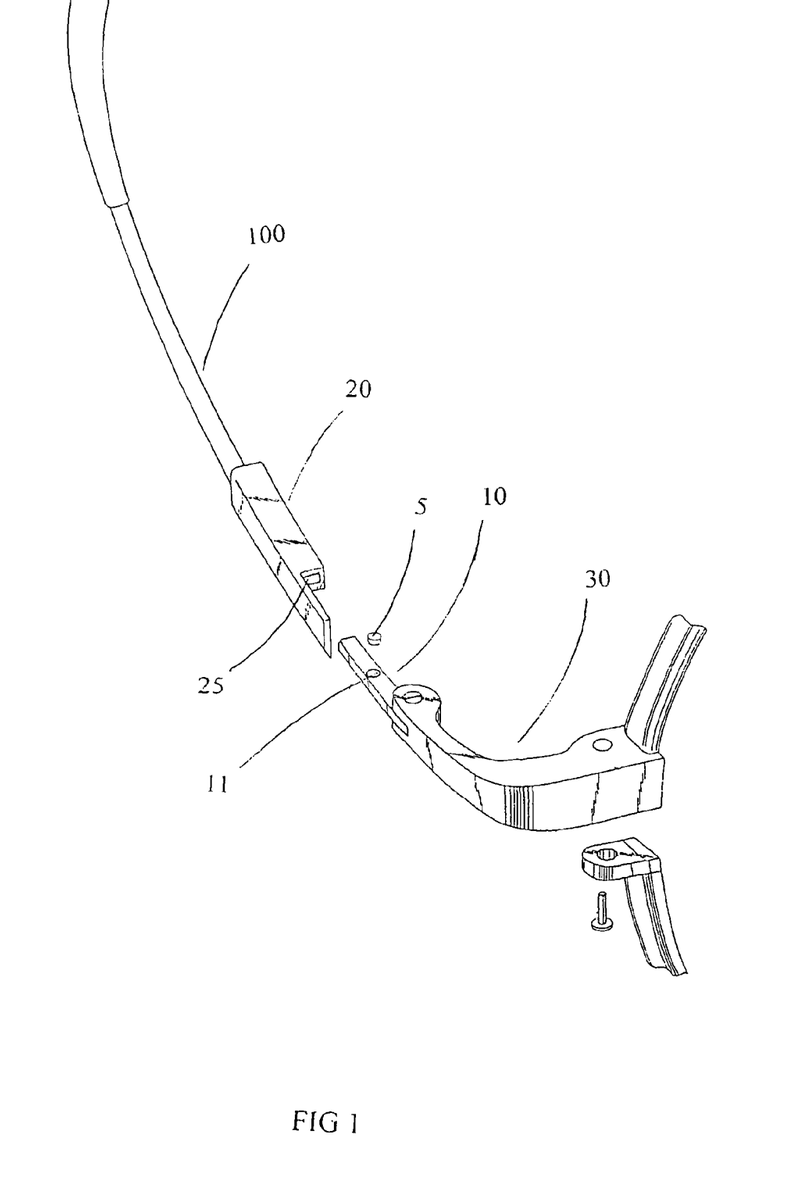
FIG. 1 is an exploded perspective view of the magnetic locker incorporating with a temple of the spectacle according to a first preferred embodiment of the present invention.

Referring to FIG. 1 of the drawings, a first preferred embodiment of the present invention is illustrated, wherein the locker is embodied as a magnetic locker to comprise the inserting portion 10 connected to an end-piece 30 and the receiving portion 20 connected to a temple 100.

Figure 2:
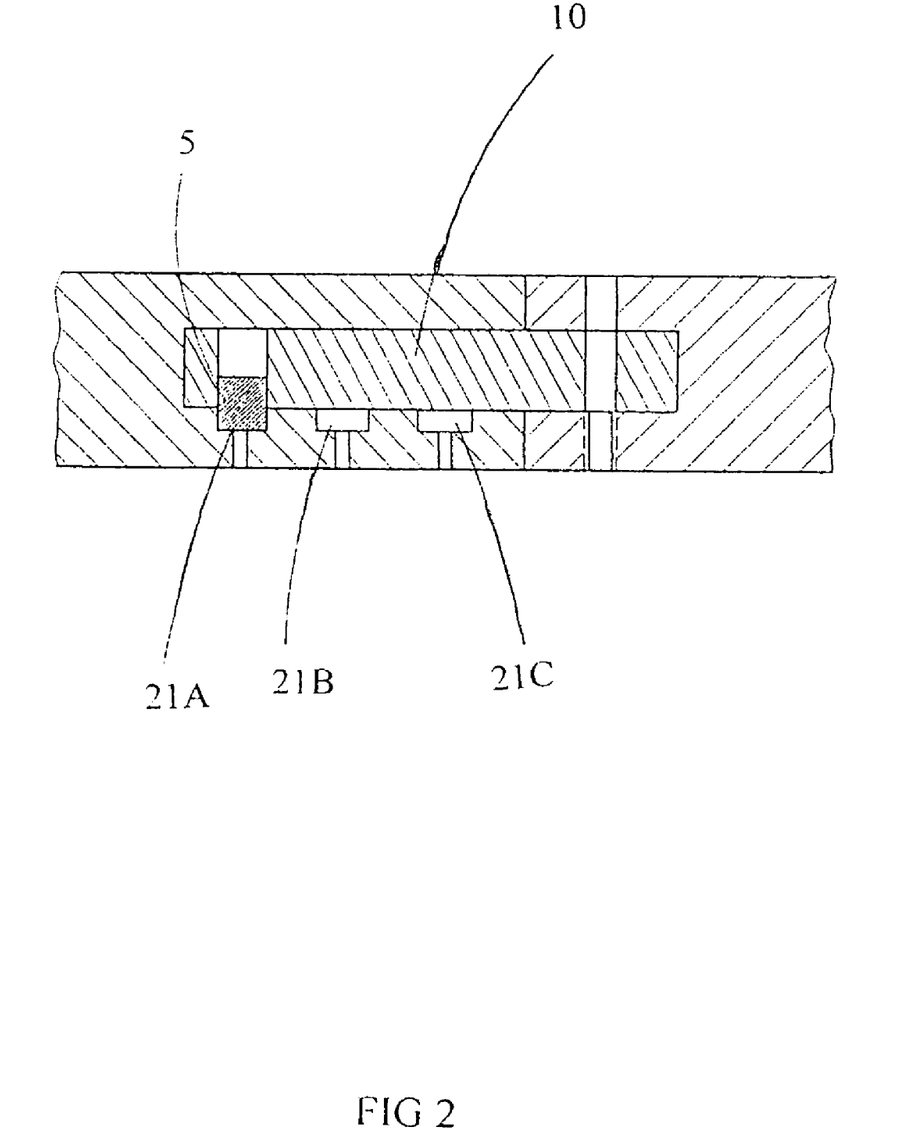
FIG. 2 is a sectional view of the magnetic locker of the spectacle, in which the changeable temple is in locking position according to the first preferred embodiment of the present invention.

The inserting portion 20 has a housing 11 for disposing the magnetic locking member of the locking mechanism, which is embodied as a locking magnet 5. The locking magnet 5 can be moved inside the housing 11 freely. The receiving portion 20 has a hollow portion 25 having a corresponding size and shape with respect to the inserting portion 10, so that the inserting portion 10 can be slid inside the receiving portion 20 freely. The receiving portion 20 has a recess portion which is made of magnetic material, as shown in FIG. 2, and has at least a recess 21 having a corresponding size and shape with respect to the locking magnet 5. When the temple 100 is inserted into the inserting portion 10, the magnetic force will guide and attract the locking magnet 5 into the recess 21 of the receiving portion 20 so as to lock the temple 100 in predetermined position. There are two methods that we can use to release the temple 100.

First, the recess portion of the receiving portion 20 further has a releasing hole 22 penetrating through the recess 21 so that a releasing pin can be used to release the temple 100. The releasing pin has at least the same size of length as the same size of thickness of the receiving portion 20. When the releasing pin is inserted into the recess 21 through the releasing hole 22 of the recess portion, the releasing pin will push the locking magnet 5 off the recess 21, so that the temple 100 can be slid off the inserting portion 10. Therefore the temple 100 is exchangeable.

Second, a releasing magnet with stronger reverse magnetic force can be used to place outside of the temple 100. For example, if the N pole of the locking magnet faced down to the recess 21 of the receiving portion 20, the N pole of releasing magnet will face up outside of the temple 100, so that the reverse magnetic force will push the locking magnet 5 off the recess 21 of the receiving portion 20 and the temple 100 can be slide off the inserting portion 10. It is worth to mention that the releasing hole 22 can be removed when the releasing magnet is equipped to release the locking position of the locking magnet 5.

Figure 3:
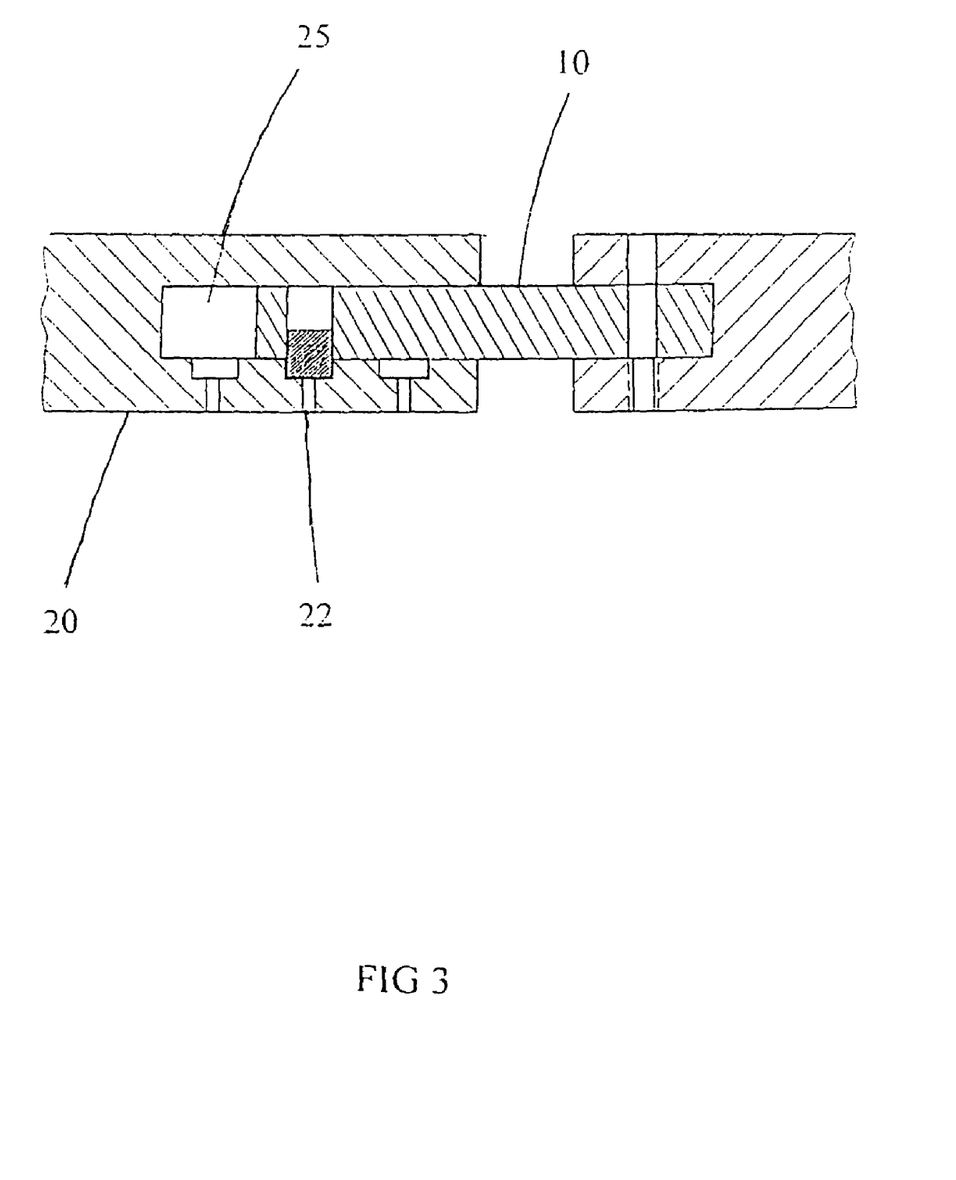
FIG. 3 is a sectional view of the magnetic locker of the spectacle, in which the exchangeable temple is in length adjusting position of the spectacle according to the first preferred embodiment of the present invention.

In actual practice as shown in FIG. 2 and FIG. 3, the receiving portion 20 has more than one recesses 21A, 21B, 21C, which increase the numbers of the predetermine locking position. When the locking magnet 5 from the inserting portion 10 reaches to the different recesses 21A, 21B, 21C of the temple 100, the temple 100 will be fixed in the different size of the length, so that the length of the temple 100 can be adjustable.

It is worth mentioning that the inserting portion 10 can be a solid portion or a spring hinge portion. It can be in different shapes of volume, such as rectangular post, cylinder post and so on. The hollow portion 25 of the changeable temple 100 has perfect match in shape and size of the inserting portion 10, so that the inserting portion 10 and the receiving portion 20 can be slid with each other freely as the locking magnet 5 is not in locking position.

Figure 4:
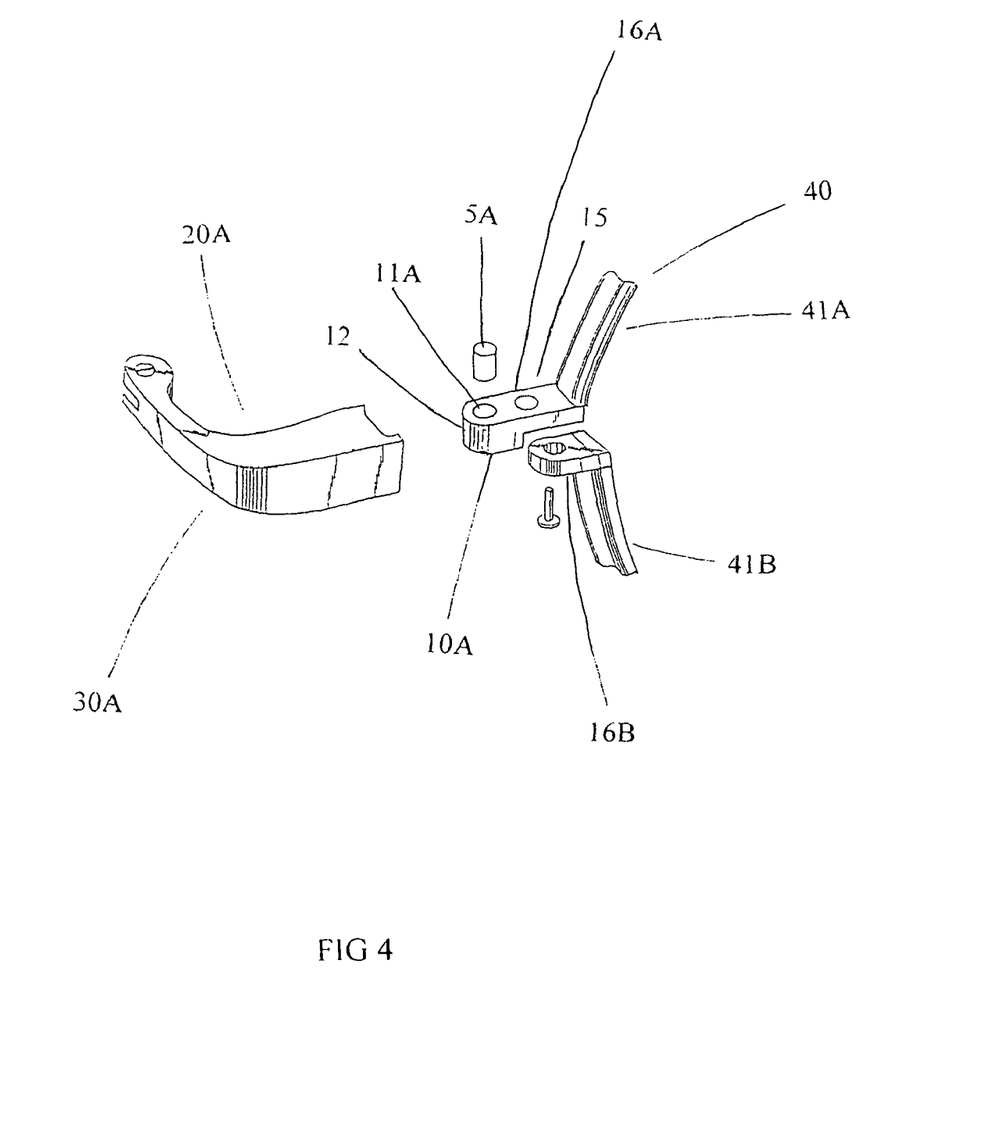
FIG. 4 is an exploded perspective view of the magnetic locker incorporating with an end-piece of the spectacle according to a second preferred embodiment of the present invention.
Figure 5:
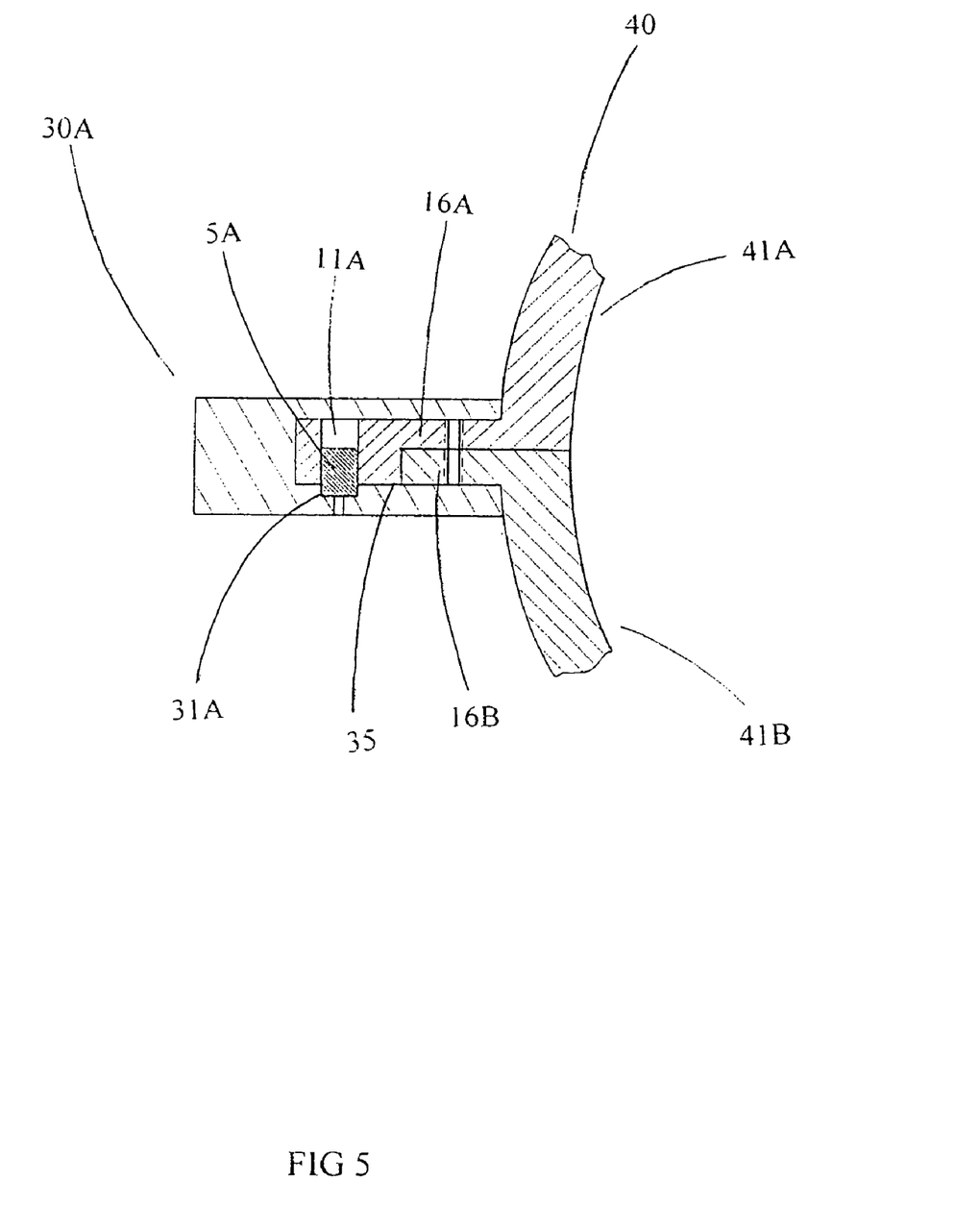
FIG. 5 is a sectional view of the magnetic locker of the spectacle, in which the end-piece is in locking position according to the second preferred embodiment of the present invention.

As shown in FIG. 4 and FIG. 5, a magnetic locker according to the second preferred embodiment of the present invention is illustrated, wherein the magnetic locker comprises an inserting portion 10A connected to a rim 40 of spectacle, a receiving portion 20A of an end-piece body 30A coupling with a temple 25. The inserting portion 10A includes a rim-locker 15 having an upper portion 16A and a lower portion 16B connected to an upper rim 41A and a lower rim 41B respectively. The rim-locker 15 has an extended portion 12 which has a housing 11A for disposing the locking magnet 5A. The locking magnet 5A can be moved inside the housing 11A freely. The end-piece 30A has a hollow portion 35, as shown in FIG. 6, having a corresponding size and shape with respect to the rim-locker 15, so that the end-piece 30A is able to insert into the rim-locker 15 or removed from the rim-locker 15 freely.

Accordingly, the hollow portion 35 has a recess portion made of magnetic material which has a recess 31A having a corresponding size and shape with respect to the locking magnet 5A. When the end-piece 30A is inserted into the rim-locker 15, the magnetic force will guide and attract the locking magnet 5A into the recess 31A of the end-piece 30A, so as to lock the end-piece 30A in predetermine position. To release the end-piece 30A from the frame, a releasing magnet or a releasing pin can be used as we mentioned the above first preferred embodiment as shown in FIGS. 1-3 of the present invention. Of course, using the releasing pin, to push the locking magnet 5A off the recess 31A can be a significant way to remove the end-piece 30A from the frame because the releasing pin is cheap and easy to make.

The major advantage of the second preferred embodiment of the present invention is that the end-piece 30A can be removable and changeable. Besides, the rim-locker 15 the frame can be concealed inside the hollow portion 35 of the end-piece 30A, so that the rim-locker 15 is invisible, it is another beneficial to the appearance of the frame.

Figure 6:
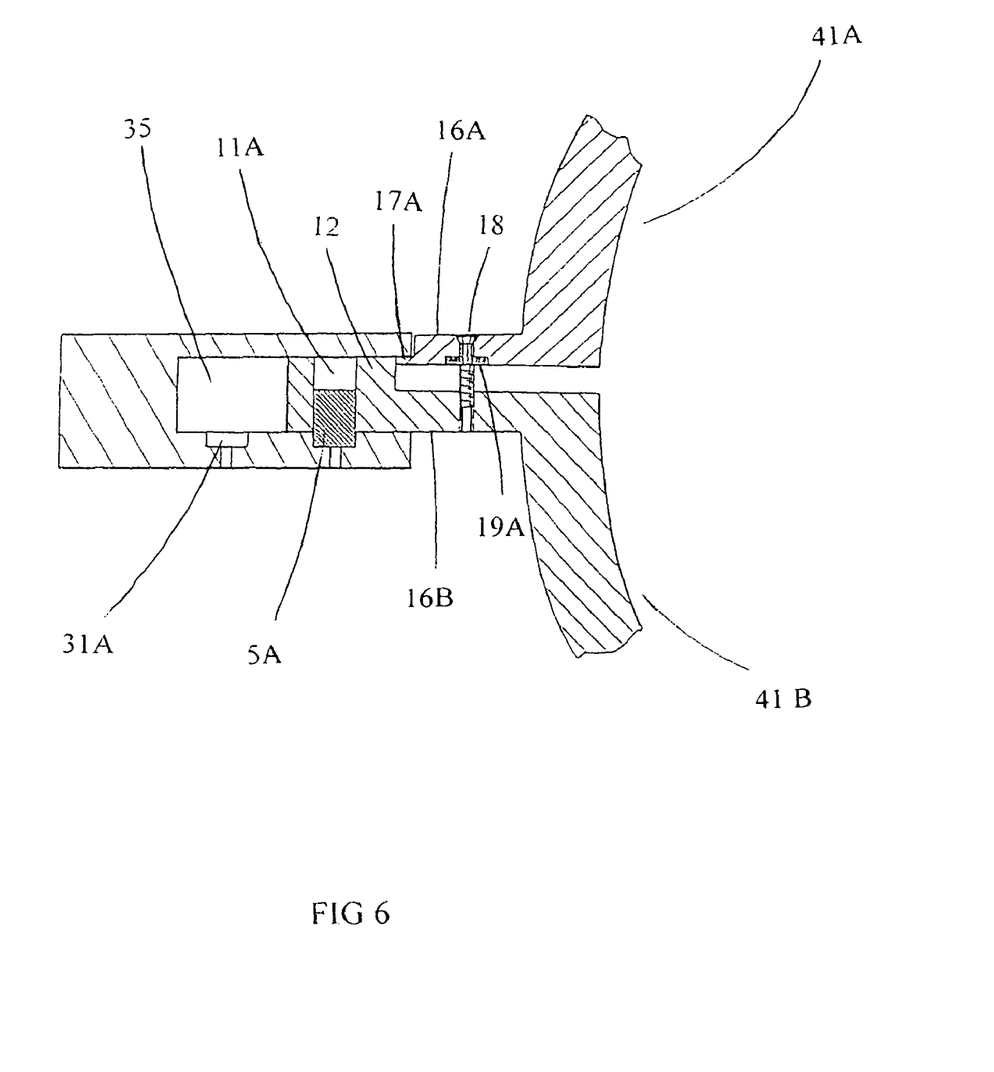
FIG. 6 is a sectional view of the magnetic locker of the spectacle, in which the end-piece is in half inserting position and the rim-lock is in open position according to the second preferred embodiment of the present invention with another alternative mode.

Referring to FIG. 6 of the drawing, there is another alternative mode for the second preferred embodiment of the present invention, wherein the rim-locker comprises an upper portion 16A having a limitation tail 17A and a lower portion 16B having an extended portion 12, wherein the extended portion 12 has a housing 11A for disposing the locking magnet 5A. The end-piece 30A has the hollow portion 35 which has two recesses 31A, when the end-piece 30A is pulled out from the rim-locker and the locking magnet 5A being locked in the second recess 31A of the end-piece 30A, the screw 18 of the rim-locker will be exposed outside of the end-piece 30A, so that we can open the rim for changing the lens by releasing the screw 18 of the rim-locker, and that the limitation tail 17A and the limitation washer 19A can prevent the screw 18 sliding off the rim-locker.

Therefore this alternative mode for the second preferred embodiment of the present invention has the following advantages:

(1) The end-piece including the whole piece of temple can be exchangeable.

(2) The rim-lockers of the frame are invisible.

(3) Convenience for changing or replacing the lenses of the frame.

(4) The screws of the rim-locker will never be loose or slid off from the frame.

Figure 7:
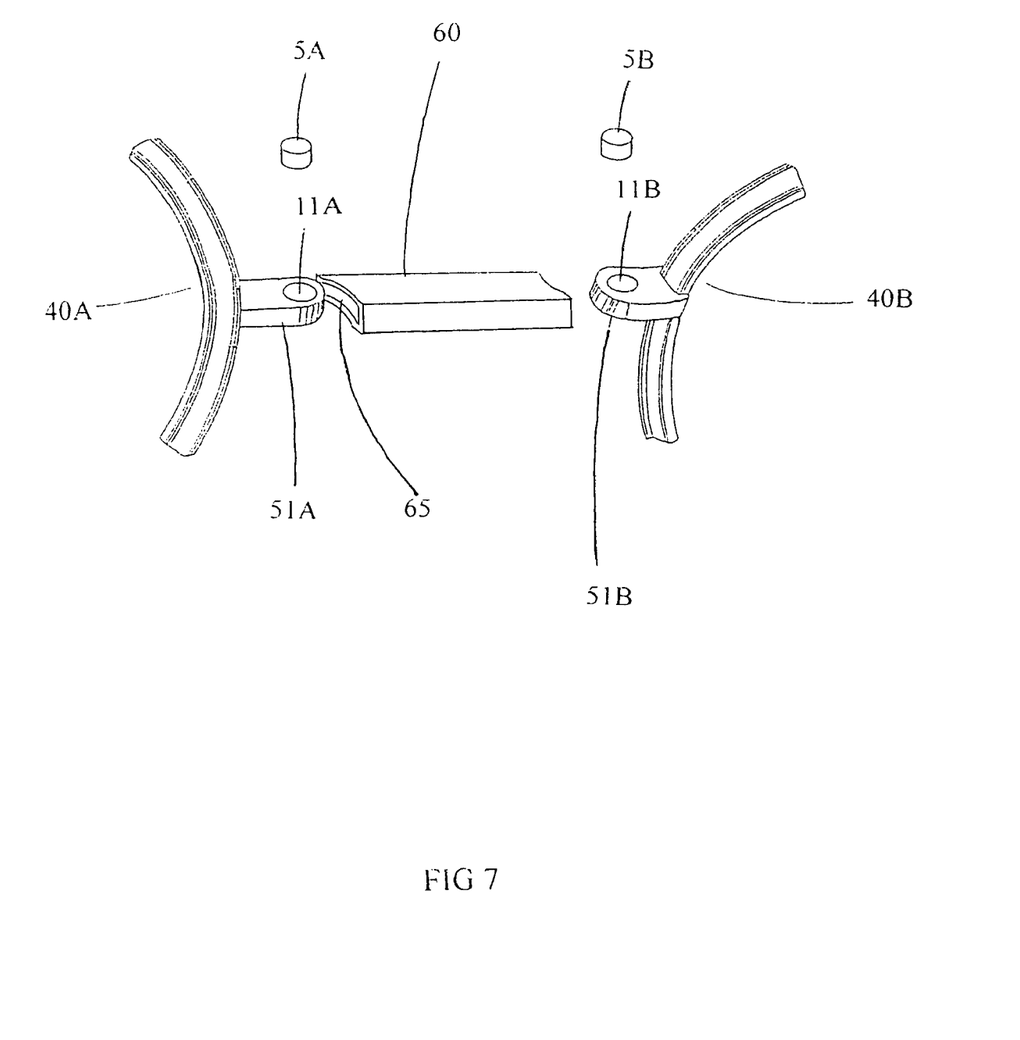
FIG. 7 is an exploded perspective view of the magnetic locker incorporating with the bridge of the spectacle according to a third preferred embodiment of the present invention.
Figure 8:
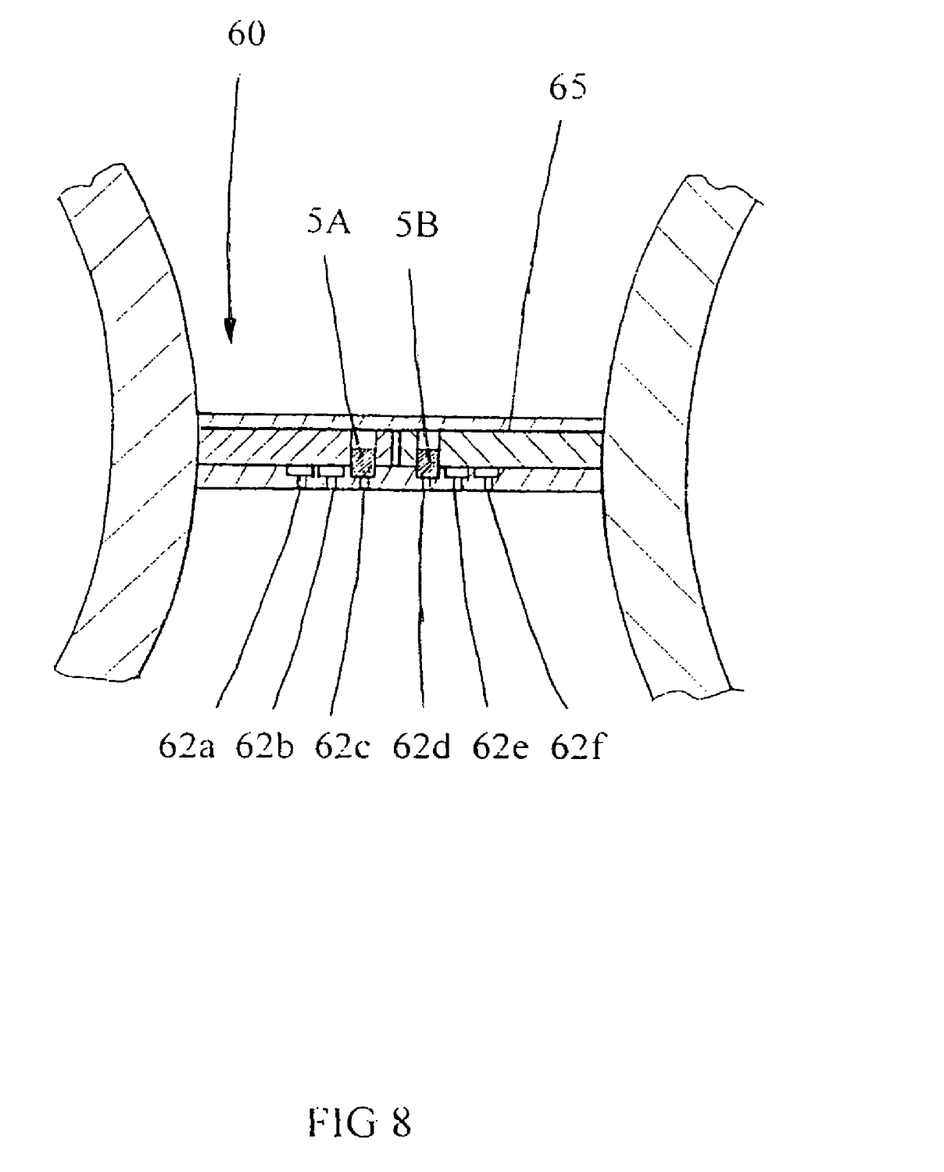
FIG. 8 is a sectional view of the magnetic locker of the spectacle, in which the bridge is in locking position according to the third preferred embodiment of the present invention.

As shown in FIG. 7 and FIG. 8, a third preferred embodiment of the present invention is illustrated. Two inserting portion 51A, 51B, which are connected to a left and a right rims 40A, 40B of the spectacle, have two housings 11A, 11B for disposing two locking magnet 5A, 5B respectively. The bridge 60 has a through hollow portion 65 made of magnetic material, wherein the through hollow portion 65 has multiple recesses 62A, 62B, 62C, 62D, 62E, 62F having a corresponding size and shape with respect to the locking magnets 5A, 5B. When the inserting portions 11A, 11B are inserted into the hollow portion 65 of the bridge 60, the magnetic force will guide and attract the locking magnets 5A, 5B to seat on the recesses 62A-F of the bridge 60. In other words, due to the multiple recesses used in the bridge 60, it becomes adjustable and changeable.

Figure 9:
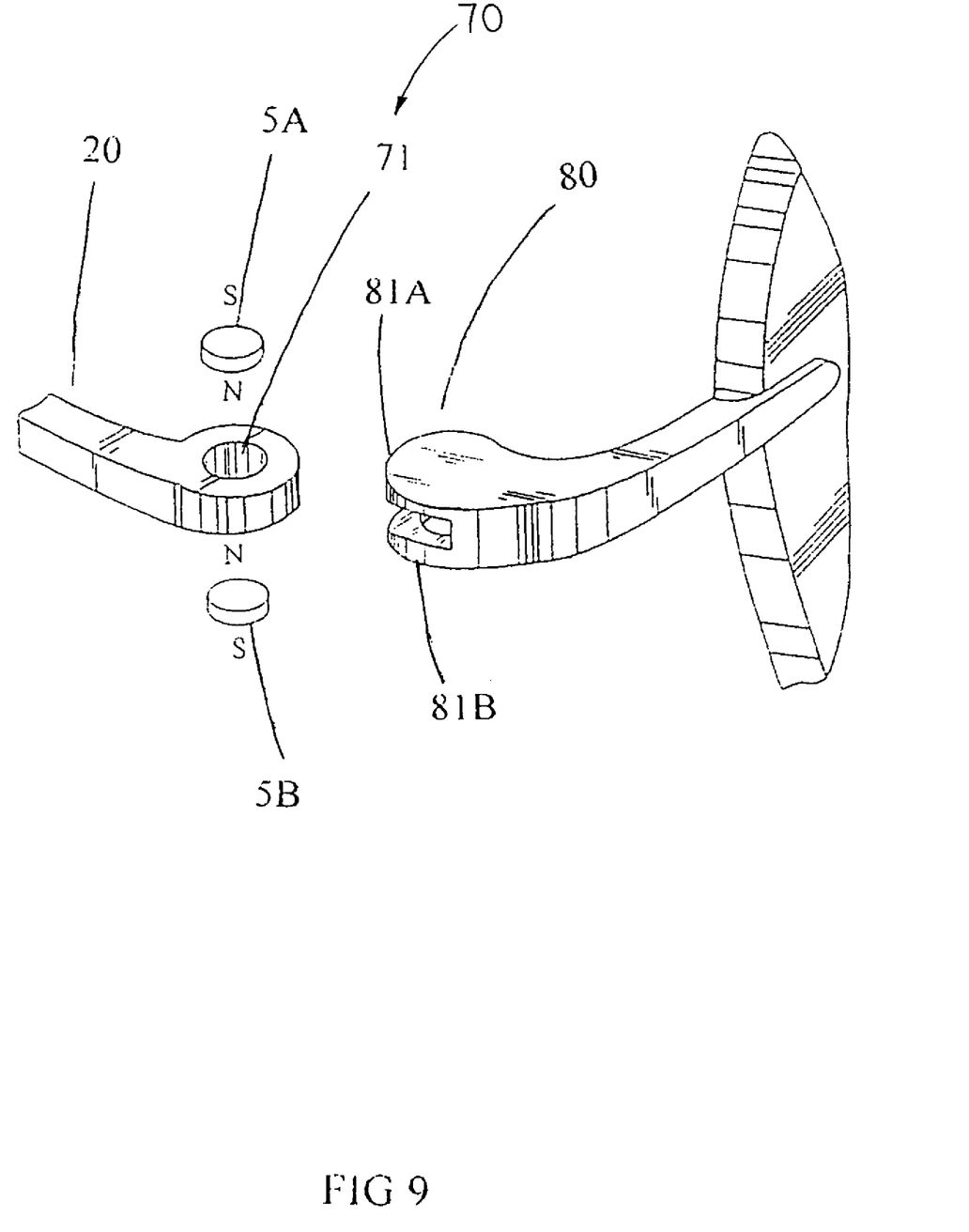
FIG. 9 is an exploded perspective view of the magnetic locker incorporating with a hinge of the spectacle according to a fourth preferred embodiment of the present invention.
Figure 10:
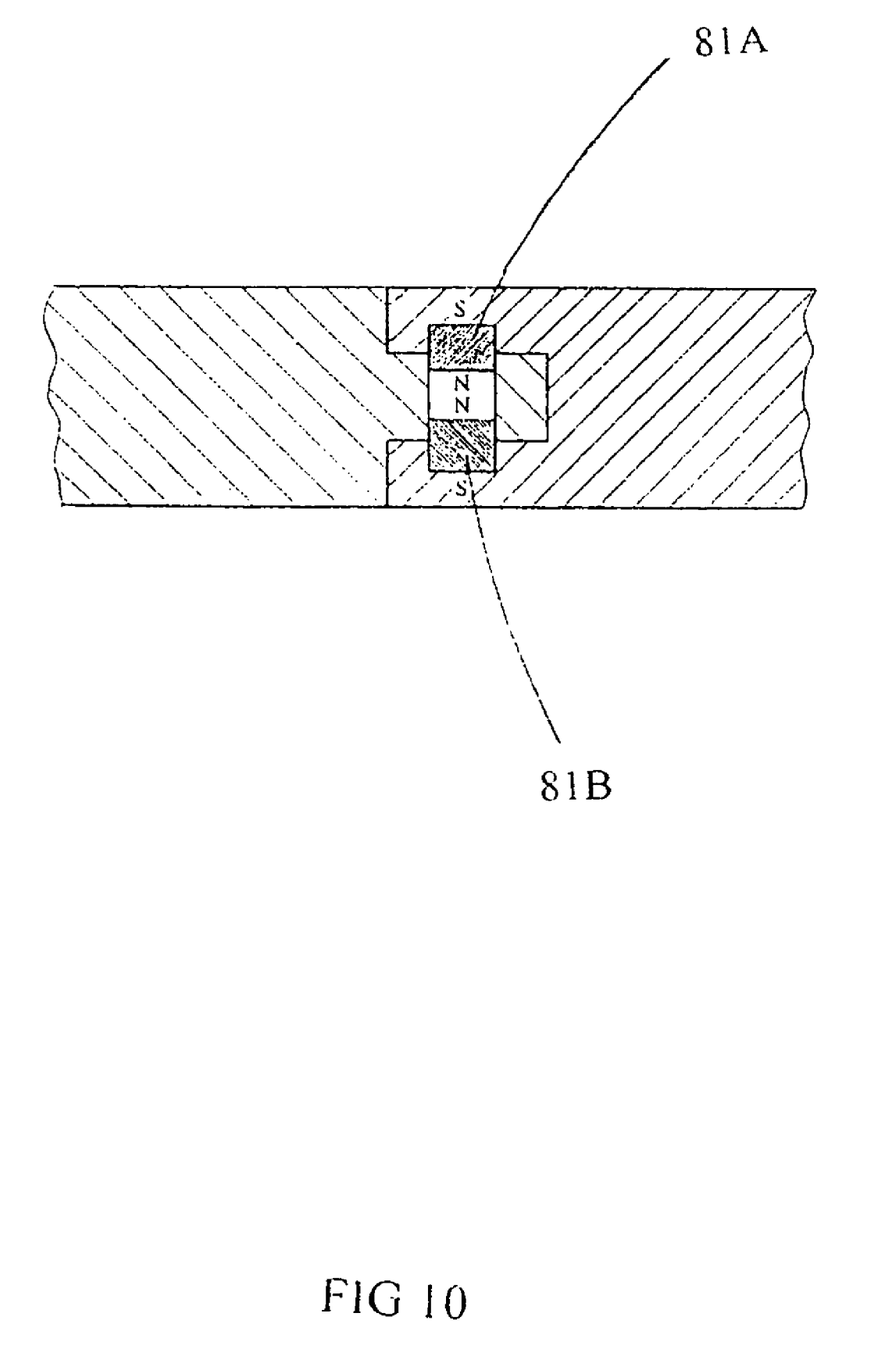
FIG. 10 is a sectional view of the magnetic locker of the spectacle, which the hinge is in operating position according to the fourth preferred embodiment of the present invention.
Figure 11A:
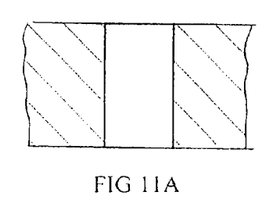
FIG. 11A and FIG. 11B are sectional views of the housing of the inserting unit, in which the housing (FIG. 11A) is a through housing and the housing (FIG. 11B) is a non-through housing.
Figure 11B:
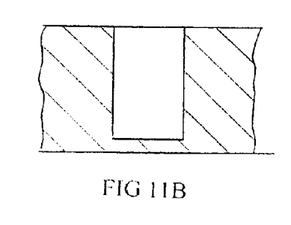
Figure 11C:
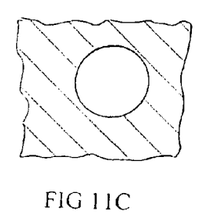
FIG. 11C, FIG. 11D, FIG. 11E and FIG. 11F indicate the different shapes of the housing to be used according to the present invention.
Figure 11D:
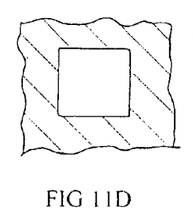
Figure 11E:
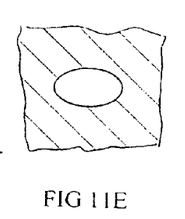
Figure 11F:
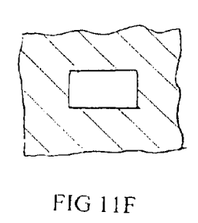
Figure 12A:
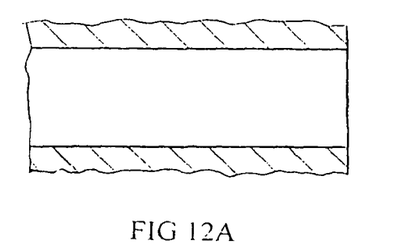
FIG. 12A and FIG. 12B are sectional views of the hollows of the receiving unit, in which the hollow (FIG. 12A) is a through hollow and the hollow (FIG. 12B) is a non-through hollow.
Figure 12B:
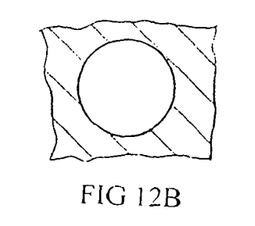
Figure 12C:
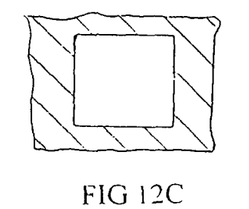
FIG. 12C, FIG. 12D and FIG. 12E indicate the different shapes of the hollow to be used according to the present invention.
Figure 12D:
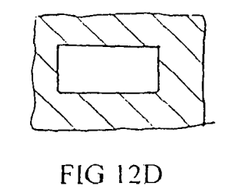
Figure 12E:
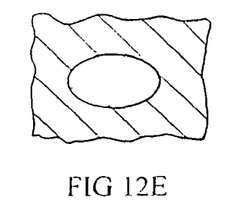

According to FIG. 9 and FIG. 10 of the drawings, a four preferred embodiment of the present invention has been illustrated. The inserting portion 70 of the hinge has a through housing 71 for disposing two repel magnets 5A, 5B. The two repel magnets 5A, 5B will be the axles for the hinge. The receiving portions 80 of the hinge have an upper portion 81A and a lower portion 81B each having a recess 82A, 82B having a corresponding size and shape with respect to each repel magnet 5A, 5B. When the inserting portion 70 of the hinge being inserted into the receiving portions 80 of the hinge, the two repel magnets 5A, 5B will play the role as the axles in the hinge. Therefore there is no screw required on the new hinge.

As illustrated in FIG. 11, a magnetic housing of an inserting portion can be embodied in different shapes of volume. As illustrated in FIG. 12, a hollow portion of a receiving portion can be embodied in different shapes of volume.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A locker for connecting a first member and a second member of a spectacle frame, comprising:

a receiving portion adapted for providing at an end of the first member of the spectacle frame;

an inserting portion, which is adapted for providing at an end of the second member of the spectacle frame, being arranged to be freely slide into said receiving portion; and a locking mechanism including a locking member movably disposed between said receiving portion and said inserting portion as a locking position to lock up said inserting portion from being detached from said receiving portion, wherein said locking member is able to be driven from said locking position to an unlocking position that said inserting portion is able to be slid out of said receiving portion for separating the first and second members, wherein said locking member is a magnetic locking member made of magnetic material for enabling the first and second members of the spectacle frame being assembled by means of magnetic force and being disassembled for user changeable, wherein said inserting portion has a housing for disposing said magnetic locking member in a freely movable manner, wherein said receiving portion has a recess portion which is made of magnetic material and has a recess having a corresponding size and shape with respect to said magnetic locking member, wherein when said inserting portion is slidably inserted into said receiving portion, said inserting portion is guided to slide at said receiving portion until said magnetic locking member is magnetically attracted at said recess to lock up a connection between said inserting portion and said receiving portion.

2. The locker, as recited in claim 1, wherein said receiving portion further has a releasing hole aligning with said recess for enabling said magnetic locking member to move out of said recess of said receiving portion to unlock said inserting portion with said receiving portion so as to detach said inserting portion from said receiving portion.

3. The locker, as recited in claim 1, wherein said receiving portion further has an additional recess positioned apart from said recess, wherein said inserting portion is slid at said receiving portion until said magnetic locking member is selectively disposed at one of said recesses to lock said inserting portion with said receiving portion.

4. A locker for connecting a first member and a second member of a spectacle frame, comprising:

a receiving portion adapted for providing at an end of the first member of the spectacle frame;

an inserting portion, which is adapted for providing at an end of the second member of the spectacle frame, being arranged to be freely slide into said receiving portion; and a locking mechanism including a locking member movably disposed between said receiving portion and said inserting portion as a locking position to lock up said inserting portion from being detached from said receiving portion, wherein said locking member is able to be driven from said locking position to an unlocking position that said inserting portion is able to be slid out of said receiving portion for separating the first and second members, wherein said inserting portion has a housing for disposing said locker in a freely movable manner, wherein said receiving portion has a recess portion which has a recess having a corresponding size and shape with respect to said locking member, wherein when said inserting portion is slidably inserted into said receiving portion, said locking member is disposed at said recess to lock up a connection between said inserting portion and said receiving portion, wherein said receiving portion further has a releasing hole aligning with said recess for enabling said locker to move out of said recess of said receiving portion to unlock said inserting portion with said receiving portion so as to detach said inserting portion from said receiving portion.

5. A locker for connecting a first member and a second member of a spectacle frame, comprising:

a receiving portion adapted for providing at an end of the first member of the spectacle frame;

an inserting portion, which is adapted for providing at an end of the second member of the spectacle frame, being arranged to be freely slide into said receiving portion; and a locking mechanism including a locking member movably disposed between said receiving portion and said inserting portion as a locking position to lock up said inserting portion from being detached from said receiving portion, wherein said locking member is able to be driven from said locking position to an unlocking position that said inserting portion is able to be slid out of said receiving portion for separating the first and second members, wherein said locking member is a magnetic locking member made of magnetic material for enabling the first and second members of the spectacle frame being assembled by means of magnetic force and being disassembled for user changeable, wherein said receiving portion further has an additional recess positioned apart from said recess, wherein said inserting portion is slid at said receiving portion until said magnetic locking member is selectively disposed at one of said recesses to lock said inserting portion with said receiving portion.

6. A spectacle frame, comprising:

two rims for holding a pair of lenses respectively, a bridge extending between two inner sides of said rims, two end pieces extending at two outer sides of said rims, and two temples extending from said end pieces respectively; and a locker provided at said spectacle frame for enabling said spectacle frame being assembled and being disassembled for user changeable, wherein said locker comprises a receiving portion, an inserting portion arranged to be freely slide into said receiving portion, a locking mechanism including a locking member movably disposed between said receiving portion and said inserting portion as a locking position to lock up said inserting portion from being detached from said receiving portion, wherein said locking member is able to be driven from said locking position to an unlocking position that said inserting portion is able to be slid out of said receiving portion for separating said inserting portion and said receiving portion, wherein said locking member is a magnetic locking member made of magnetic material, wherein said magnetic locking member is provided at said spectacle frame for enabling said spectacle frame being assembled by means of magnetic force and being disassembled for user changeable, said inserting portion having a housing for disposing said magnetic locking member in a freely movable manner, said receiving portion having a recess portion made of magnetic material and has a recess having a corresponding size and shape with respect to said magnetic locking member, wherein when said inserting portion is slidably inserted into said receiving portion, said magnetic member is disposed at said recess by means of magnetic force.

7. The spectacle frame, as recited in claim 6, wherein said inserting portion is extended from each of said end pieces of said spectacle frame, wherein said receiving portion is extended from each of said temples, such that when said inserting portion is slid into said receiving portion, said locking magnet is disposed at said recess of said receiving portion to lock said inserting portion with said receiving portion so as to lock up said temple with said respective end piece.

8. The spectacle frame, as recited in claim 7, wherein said receiving portion of said magnetic locking member further has a releasing hole aligning with said recess for enabling said locking magnet to move out of said recess of said receiving portion to unlock said inserting portion with said receiving portion so as to detach said temple from said respective end piece.

9. The spectacle frame, as recited in claim 8, wherein said recess is made of magnetic material, such that said inserting portion is guided to slide at said receiving portion until said locking magnet is magnetically attracted at said recess to couple said temple with said respective end piece.

10. The spectacle frame, as recited in claim 9, wherein said receiving portion further has an additional recess positioned apart from said recess, wherein said inserting portion is slid at said receiving portion until said locking magnet is selectively disposed at one of said recesses to lock said inserting portion with said receiving portion so as to adjust a length of said temple.

11. The spectacle frame, as recited in claim 7, wherein said inserting portion is guided to slide at said receiving portion until said locking magnet is magnetically attracted at said recess to couple said temple with said respective end piece.

12. The spectacle frame, as recited in claim 7, wherein said receiving portion further has an additional recess positioned apart from said recess, wherein said inserting portion is slid at said receiving portion until said locking magnet is selectively disposed at one of said recesses to lock said inserting portion with said receiving portion so as to adjust a length of said temple.

13. The spectacle frame, as recited in claim 6, wherein said inserting portion is extended from said outer side of each of said rims of said spectacle frame, wherein said receiving portion is extended from each of said end pieces, such that when said inserting portion is slid into said receiving portion, said locking magnet is disposed at said recess of said receiving portion to lock said inserting portion with said receiving portion so as to lock up said end piece with said respective rim.

14. The spectacle frame, as recited in claim 13, wherein said receiving portion of said magnetic locking member further has a releasing hole aligning with said recess for enabling said locking magnet to move out of said recess of said receiving portion to unlock said inserting portion with said receiving portion so as to detach said end piece from said respective rim.

15. The spectacle frame, as recited in claim 14, wherein said inserting portion is guided to slide at said receiving portion until said locking magnet is magnetically attracted at said recess to couple said end piece with said respective rim.

16. The spectacle frame, as recited in claim 15, wherein each of said rims has an upper rim and a lower rim detachably attached with each other to hold said respective lens, wherein said inserting portion comprises a rim locker having an upper portion extended from said upper rim, a lower portion extended from said lower rim, and an extended portion extended from said upper portion at a position that said housing is formed at said extended portion, wherein when said magnetic locking member is disposed at said recess of said receiving portion to lock said inserting portion with said receiving portion, said rim locker is invisibly concealed within said receiving portion not only for ensuring said respective lens being securely held within said rim but also for enhancing an appearance of said spectacle frame.

17. The spectacle frame, as recited in claim 16, wherein said receiving portion further has a second recess positioned apart from said recess, wherein when said end piece is slidably pulled out from said respective rim at a position that said magnetic locking member is disposed at said second recess, a fastener of said rim locker is slid out of said receiving portion, such that upper portion of said rim is adapted to be unlocked with said lower portion thereof for detaching said lens from said respective rim while said end piece is remained attach to said rim.

18. The spectacle frame, as recited in claim 17, wherein said rim locker further has a limitation tail extended from said upper portion for engaging with said receiving portion to prevent said fastener sliding off said rim locker.

19. The spectacle frame, as recited in claim 6, wherein locking mechanism further comprises another magnetic locking member, wherein said inserting portion is extended from each of said rims of said spectacle frame, wherein said receiving portion is extended from each end of said bridge, such that when said inserting portions are slid into said receiving portions respectively, said magnetic locking members are disposed at said recesses of said receiving portions to lock said inserting portions with said receiving portions so as to lock up said bridge between said rims.

20. The spectacle frame, as recited in claim 19, wherein each of said receiving portion of said magnetic locking member further has a releasing hole aligning with said respective recess for enabling said magnetic locking member to move out of said recess of said receiving portion to unlock said inserting portion with said receiving portion so as to detach said bridge from said respective rim.

21. The spectacle frame, as recited in claim 20, wherein said inserting portion is guided to slide at said receiving portion until said magnetic locking member is magnetically attracted at said recess to couple said bridge with said respective rim.

22. The spectacle frame, as recited in claim 21, wherein two or more of said additional recesses are spacedly provided at said receiving portions respectively, wherein said inserting portions are slid at said receiving portions until each of said magnetic locking members is selectively disposed at one of said recesses to lock said inserting portion with said receiving portion so as to adjust a length of said bridge.

23. The spectacle frame, as recited in claim 22, wherein said bridge has a hollow structure defining said receiving portions at two ends of said bridge.

\* \* \* \* \*